United States Patent
Stotsky

[19]

[11] Patent Number: 6,138,057
[45] Date of Patent: Oct. 24, 2000

[54] METHOD FOR GAUGING A MOLD CAVITY FOR INJECTION MOLDING

[75] Inventor: Steven M. Stotsky, Easton, Mass.

[73] Assignee: Reebok International Ltd., Canton, Mass.

[21] Appl. No.: 09/107,405

[22] Filed: Jun. 30, 1998

[51] Int. Cl.[7] .................................................. B29C 45/00
[52] U.S. Cl. ......................................................... 700/200
[58] Field of Search .............................. 700/95, 97, 106, 700/117, 118, 197, 200

[56] References Cited

U.S. PATENT DOCUMENTS

| | | | |
|---|---|---|---|
| 4,364,188 | 12/1982 | Turner et al. | 36/31 |
| 4,823,483 | 4/1989 | Chapnick | 36/43 |
| 5,021,261 | 6/1991 | Bowman | 427/286 |
| 5,491,643 | 2/1996 | Batchelder | 364/512 |

*Primary Examiner*—Thomas M. Heckler
*Attorney, Agent, or Firm*—Sterne, Kessler, Goldstein, & Fox P.L.L.C.

[57] ABSTRACT

The present invention consists of a method for gauging a mold cavity to be used in the injection molding of a foam product, such as a sole of an article of footwear. The method comprises the steps of selecting a durometer for the product, determining a thickness expansion ratio based on the durometer selecting a thickness value, selecting a material based on the thickness value and thickness expansion ratio, dividing a model of the final product into a plurality of sections, determining a length/width expansion ratio for each section, gauging a mold model for each section based on the expansion ratio for each section, and constructing a composite mold model using the guaged sections.

24 Claims, 15 Drawing Sheets

METHOD FOR GAUGING A MOLD CAVITY FOR INJECTION MOLDING

BACKGROUND OF THE INVENTION

1. Field of the Invention

The present invention relates generally to injection molding of foam products, and to gauging the size and shape of a mold cavity. Specifically, the present invention relates to gauging the size and shape of a mold cavity for injection molding components of articles of footwear.

2. Related Art

Foam products made by hot injection molding of certain material, such as olefin polymer-based foam, expand after manufacture. Once curing has taken place in the mold, the expansion occurs after the mold is opened. A manufacturer of any such product must therefore construct a mold whose cavity is smaller than the final desired size of the product. The problem facing the manufacturer is how to properly size or gauge, the mold cavity. The manufacturer must determine how much smaller the mold cavity must be, relative to the desired size of the final product. The mold cavity must be gauged so that the product is the correct size after expansion and post-processing shrinkage.

Proper gauging is complicated by several factors. First, the amount of expansion, or expansion ratio, varies for different material. (Note: Expansion ratio is defined as the ratio of a dimension of an object (such as thickness) after expansion and post-processing shrinkage, to the same dimension before expansion.) Specifically, different proportions of a compound in combination with a blowing agent will have different expansion ratios.

Second, for many materials, a non-constant, non-linear relationship exists between expansion ratio and final thickness of a product at its thinnest point. (Note: Thickness of a mold cavity refers to the distance in the cavity between the two opposing mold surfaces. Thickness of a product refers to the corresponding distance on the product. The latter is illustrated in FIG. 8C, where the object depicted is a portion of the sole of a shoe.) For a specific material, a product will have expanded according to different expansion ratios to reach different thicknesses.

Manufacture of a product that is two centimeters thick, for example, requires a mold cavity of some lesser thickness. After removal from this mold, expansion takes place, yielding a final product that is two centimeters thick.

Manufacture of a product that is one centimeter thick also requires a mold cavity of a lesser thickness. After removal from this mold, expansion takes place, yielding a final product that is one centimeter thick. But empirically, the expansion ratio in the first case is greater than in the second case. The two centimeter product will have undergone greater proportional expansion than the one centimeter product. In general, a relationship exists between expansion ratio and final thickness, such that the expansion ratio is greater with larger final thicknesses.

The relationship, however, is not constant and not linear. If the relationship between the expansion ratio and final thickness were linear or constant, it would be relatively easy to gauge a mold cavity. Knowing the final thickness of a product made with a given material would allow a straightforward determination of its expansion ratio. The necessary mold cavity size could then be determined based on the expansion ratio. Because the relationship between the expansion ratio and final thickness is neither linear nor constant, however, determination of expansion ratio given a final desired thickness is more problematic.

Third, if the final product is irregularly shaped, gauging the mold cavity becomes difficult. The sole for an item of athletic footwear, for example, is highly irregular. The thickness of the sole varies from point to point. Even if the expansion ratio can be determined for a specific thickness, gauging of a mold cavity for the sole becomes difficult because the expansion ratio will, like the thickness, vary from point to point.

Prior to the present invention, gauging of mold cavities has been done by trial and error. While ultimately effective, such an approach is wasteful time consuming, and often results in misshaped or incorrectly sized products. Hence there is a need for a method by which mold cavities can be gauged accurately, so that the resulting product will be the necessary size and shape after expansion and post-processing shrinkage.

SUMMARY OF THE INVENTION

The present invention consists of a method for gauging a mold cavity to be used in the injection molding of a product, e.g., a sole or a portion of a sole of an article of footwear, made of material such as olefin polymer-based foam. The method comprises the steps of selecting a durometer for the product, determining a thickness expansion ratio based on the durometer, selecting a thickness value, selecting a material based on the thickness value and thickness expansion ratio, dividing a model of the final product into a plurality of sections, determining a length/width expansion ratio for each section, gauging a mold model for each section based on the expansion ratio for each section, and constructing a composite mold model using the gauged sectional mold models.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Overview

The present invention provides a method by which a mold cavity can be gauged, given a desired final size and shape of a product and the tendency of a molded material to expand after molding. The embodiment of the invention provided below applies this method to gauging the mold cavity of a footwear component (such as a sole) made of MJ14, given a desired final size and shape of the component, and the tendency of MJ14, when combined with some amount of a blowing agent, to expand after molding. This gauging method permits a manufacturer to determine the size and shape of a mold cavity, so that the final component, after molding, expansion, and post-processing shrinkage, has the necessary size and shape.

Select durometer

The desired durometer for the product must first be established. As will be seen below, this permits subsequent determination of a thickness expansion ratio (i.e., the ratio of the thickness of an object after expansion and post-processing shrinkage, to the thickness before expansion). This, in turn, permits selection of a specific material (i.e. a specific proportion of a compound such as MJ14 and a blowing agent) for molding.

Figure 1:
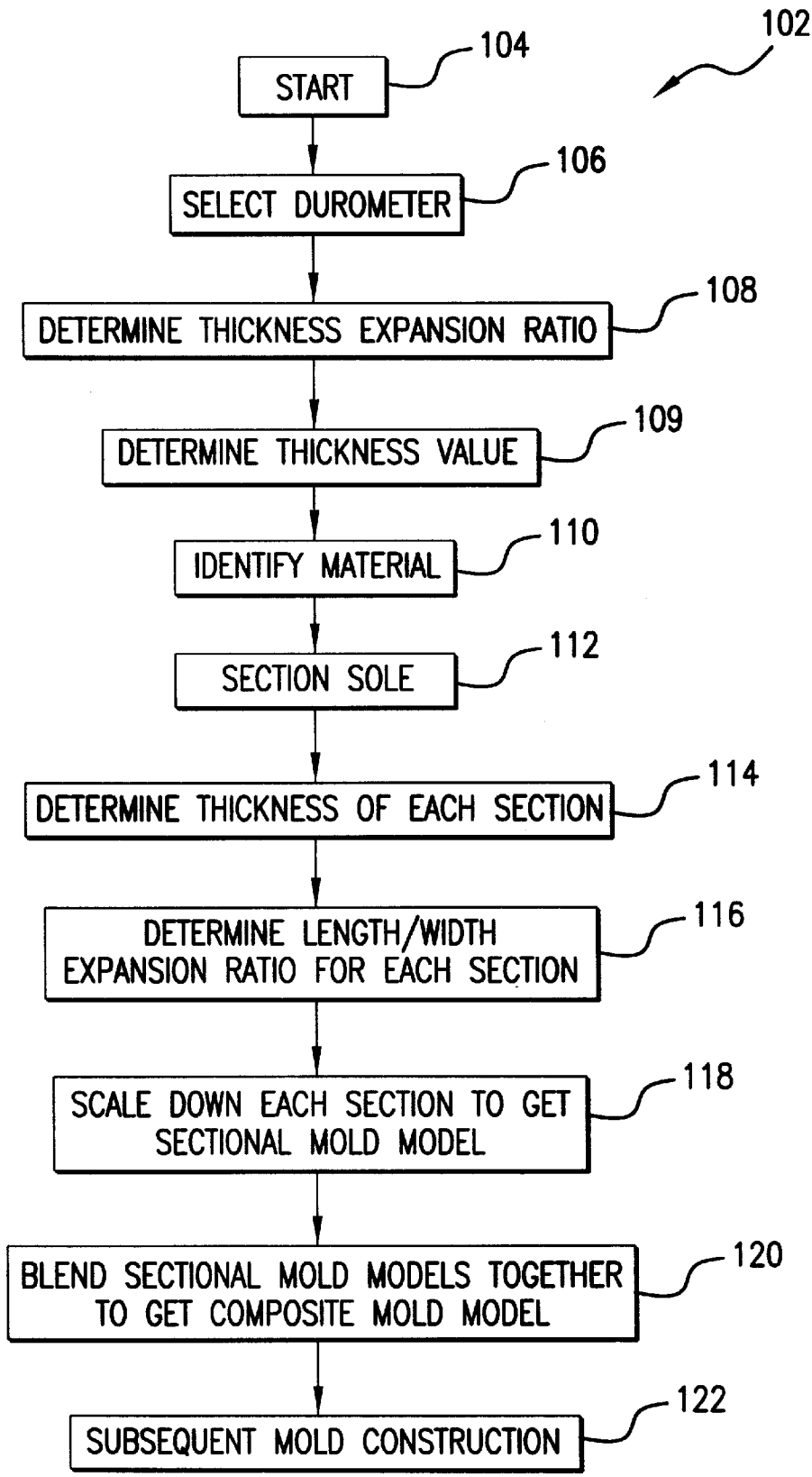
FIG. 1 is a flowchart illustrating the process of gauging the mold cavity of a shoe sole, according to an embodiment of the invention.

Referring to FIG. 1, the selection of a durometer is performed in a step 106. In an embodiment of the invention, the durometer is selected by identifying the durometer required at a specific point of the product. For purposes of this embodiment, in gauging the mold cavity of a shoe sole (e.g., midsole and/or outsole), the durometer is chosen to be that which is required at the thickest point of the heel portion of the sole. However, it would be apparent to one skilled in the relevant art that the durometer at any point could be selected for the specific product being molded, based on the size and shape of the product and the intended use or function of the product.

Determine expansion ratio

Once the durometer has been selected, the thickness expansion ratio of the material can be determined. The thickness expansion ratio, along with the thickness value (to be discussed below), is used to identify a specific material for molding the product. Given a specific material, its specific expansion characteristics may be determined for purposes of gauging the mold cavity.

Figure 2:
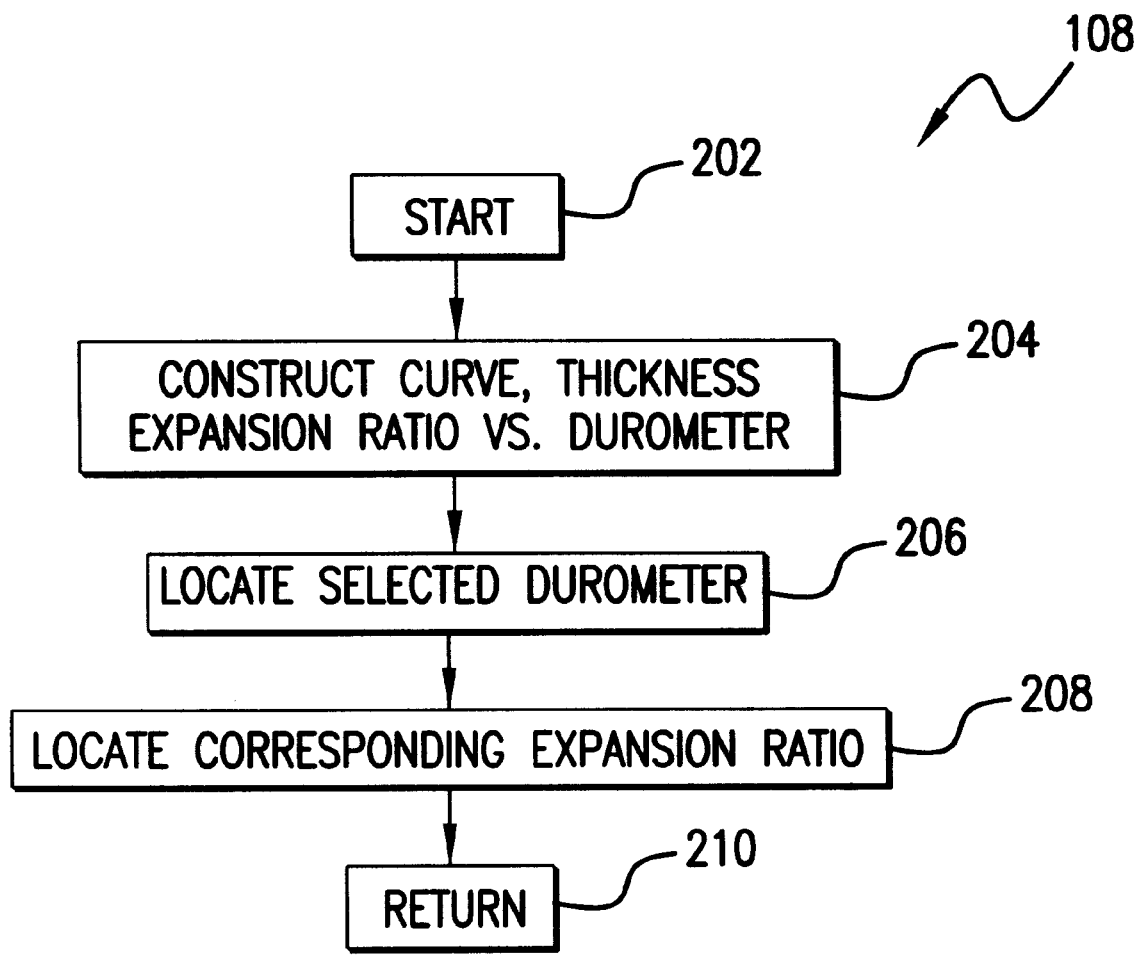
FIG. 2 is a flowchart illustrating determination of a thickness expansion ratio, given a selected durometer, according to an embodiment of the invention.
Figure 3:
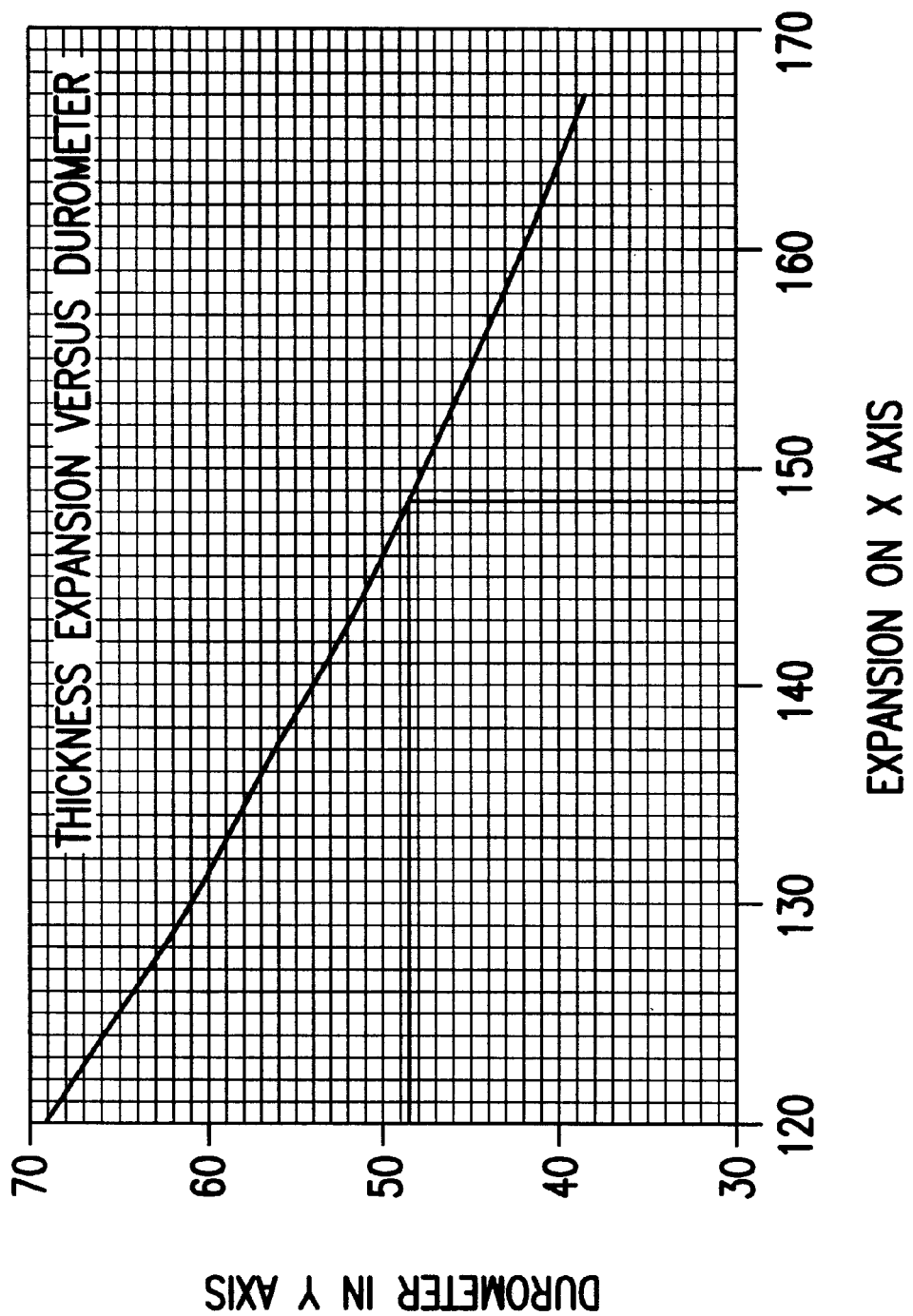
FIG. 3 is a graph of thickness expansion ratio versus durometer.

The process of determining the thickness expansion ratio is identifed in a step 108, and illustrated in greater detail in FIGS. 2 and 3. In a step 204, a graph of thickness expansion ratio versus durometer is plotted; an example of a resulting curve is illustrated in FIG. 3. As indicated in FIG. 3, durometer of a product is a function of the thickness expansion ratio. Construction of such a curve would be apparent to one skilled in the relevant art, based on experimental testing of a particular compound. In the graph shown in FIG. 3, the thickness expansion ratio versus durometer curve was developed by testing the compound MJ14, which was combined with varying amounts of a blowing agent to vary the thickness expansion ratio. In step 206, the selected durometer is located on the y-axis. In step 208, the corresponding point on the curve is found, and the associated thickness expansion ratio is located on the x-axis.

Determine thickness value

A thickness value, along with the thickness expansion ratio (discussed above), is needed to identify a specific material with which to mold the product. Given a specific material, its specific expansion characteristics may be determined for purposes of gauging the mold cavity.

Referring again to FIG. 1, the selection of a thickness value is performed in step 109. In an embodiment of the invention, the thickness value is selected by identifying the thickness of the product at a specific point. In gauging the mold cavity of a shoe sole, the thickness value is chosen to be the thickness of the sole at the thickest point of the heel portion of the sole. However, it would be apparent to one skilled in the relevant art that, in other embodiments of the invention, the thickness value could be determined at other points in the product, depending on the particular size and shape of the product.

Select material

The thickness value, along with the thickness expansion ratio, is used to identify a material to be molded into the product. Given a specific material, its expansion characteristics can subsequently be determined for purposes of gauging the mold cavity.

Figure 4:
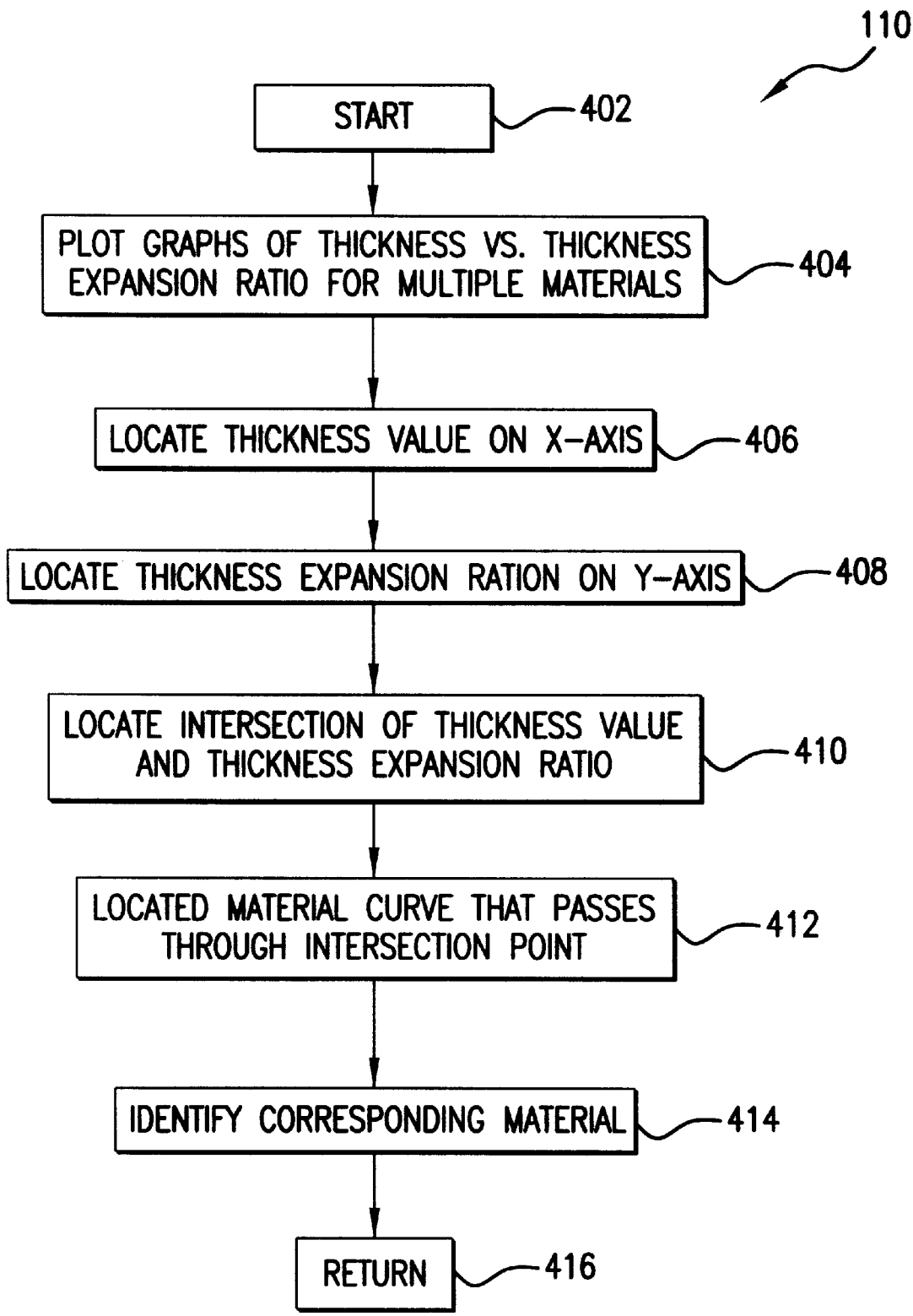
FIG. 4 is a flowchart illustrating material selection, given a thickness value and a thickness expansion ratio, according to an embodiment of the invention.
Figure 5:
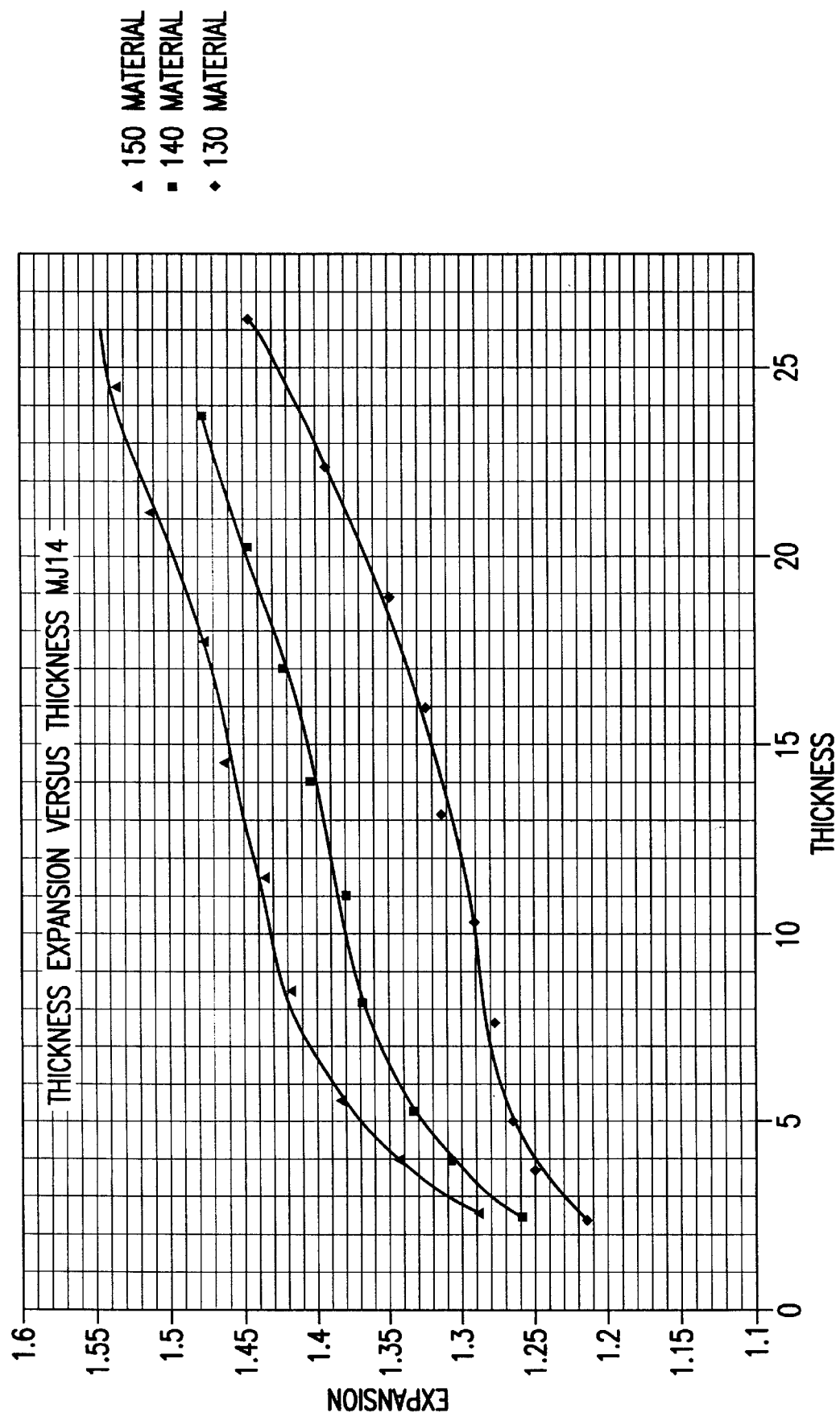
FIG. 5 is a graph of thickness versus thickness expansion ratio for three materials.
Figure 8A:
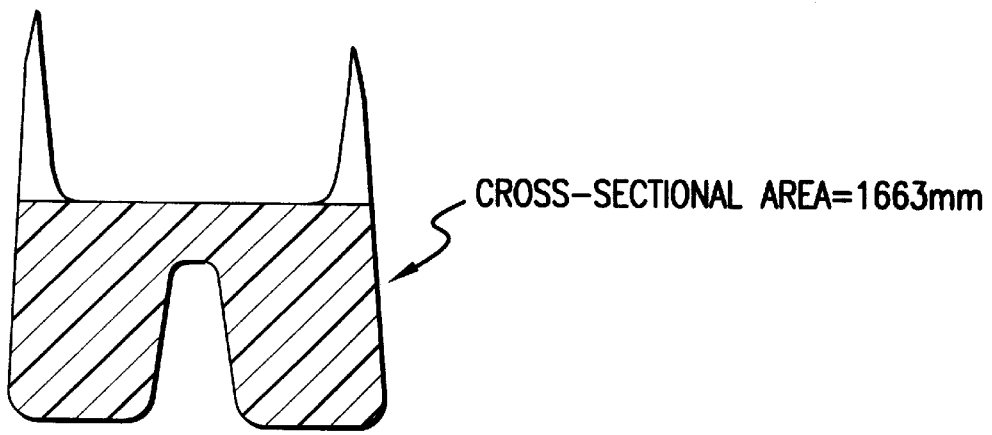
FIG. 8A is an illustration of the area of a cross-sectional surface of a shoe sole section.
Figure 11:
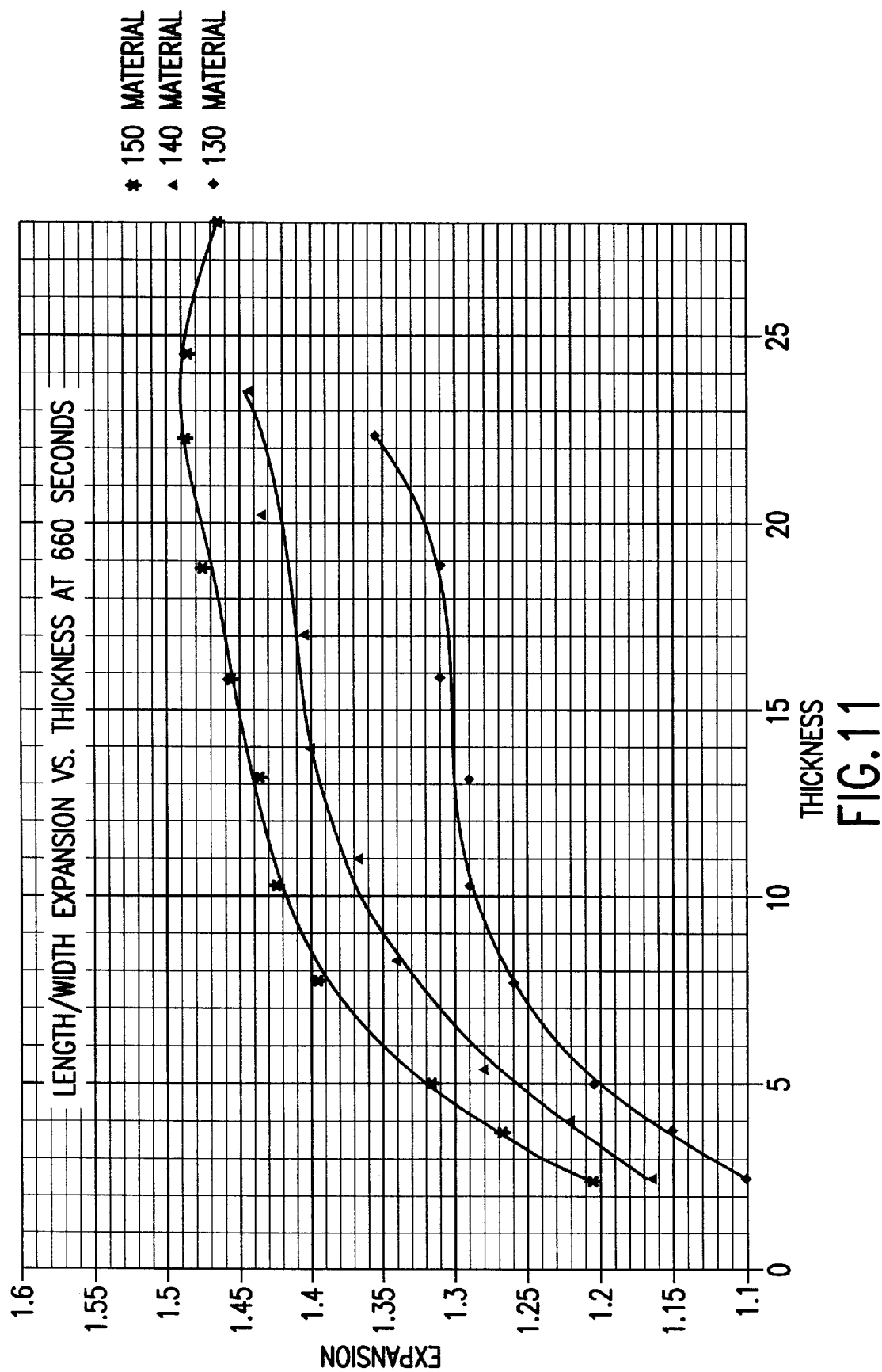
FIG. 11 is a graph of thickness versus length/width expansion ratio for three materials.

Material identification is indicated in a step 110, and illustrated in greater detail in FIG. 4. In a step 404, graphs are plotted depicting thickness expansion ratio as a function of thickness, with different curves representing different materials. In an embodiment of the invention, the different materials may consist of a compound (or a combination of compounds) mixed with different amounts of blowing agent. Exemplary curves are illustrated in FIG. 5. In the graph shown in FIG. 5, the different materials consist of the MJ14 compound combined with different amounts of a blowing agent. In a step 406, the thickness value determined in step 109 is located on the x-axis; in a step 408, the thickness expansion ratio determined in step 108 is located on the y-axis. In a step 410, the intersection of these two values is found. In a step 412, the curve passing closest to this point is identified. In a step 414. the material corresponding to this curve is identified. This material is selected for molding the product. Section sole Because the materials being used expand after molding, the mold cavity must be made smaller than the final product. Hence, to obtain the dimensions of a mold cavity that will yield a properly-sized product after expansion and post-processing shrinkage, the dimensions of the desired final product must be measured, then scaled down according to the expansion ratio of the selected material. In this embodiment of the invention, the length/width expansion ratio is used for this step. (Note: Length/width expansion ratio refers to the ratio of length or width of an object after expansion and post-processing shrinkage, to the length or width, respectively, before expansion. Length refers to the distance from the front of an object to its back, while width refers to the distance from the left side of an object to the right. Both are illustrated in FIG. 8C with respect to a portion of a shoe sole.) The length/width expansion ratio, however, like the thickness expansion ratio, varies with the thickness of the product as illustrated in FIG. 11. If the product is shaped such that it has different thicknesses at different points (e.g., a footwear sole), then a model of the final product must be sectioned, so that the thickness of each section may be measured separately. For each section, the dimensions of the section can then be scaled down according to the length/width expansion ratio for that thickness. This yields the necessary dimensions for the corresponding section of the mold cavity.

Figure 6:
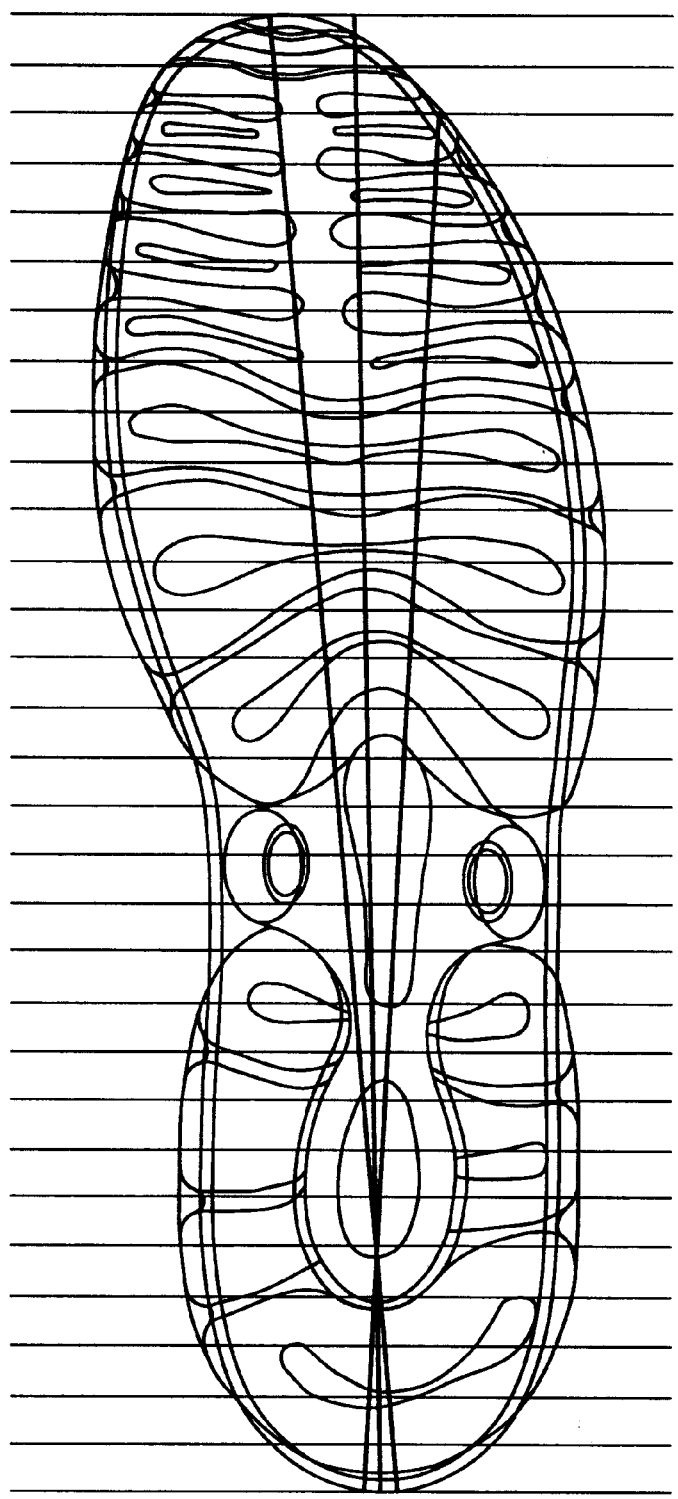
FIG. 6 is an illustration of the sectioning of an exemplary shoe sole model, according to an embodiment of the invention.

The process of sectioning a sole is identified in FIG. 1 in a step 112. In one embodiment of the invention, sectioning is done along the length of the sole, at 10 mm intervals. This is illustrated in FIG. 6. However, it would be apparent to one skilled in the relevant art that the sole (or other product being molded) could be sectioned at different intervals, resulting in two or more different sections of the model. The more sections used, the more accurate the gauging of the mold cavity will be.

Determine section thickness

As discussed above, because length/width expansion ratio is a function of thickness, the thickness of each section must be determined in order to establish the length/width expansion ratio for that section. For each section, the dimensions of the section can then be scaled down according to the length/width expansion ratio for that thickness. This yields the necessary dimensions for the corresponding section of the mold.

Figure 7:
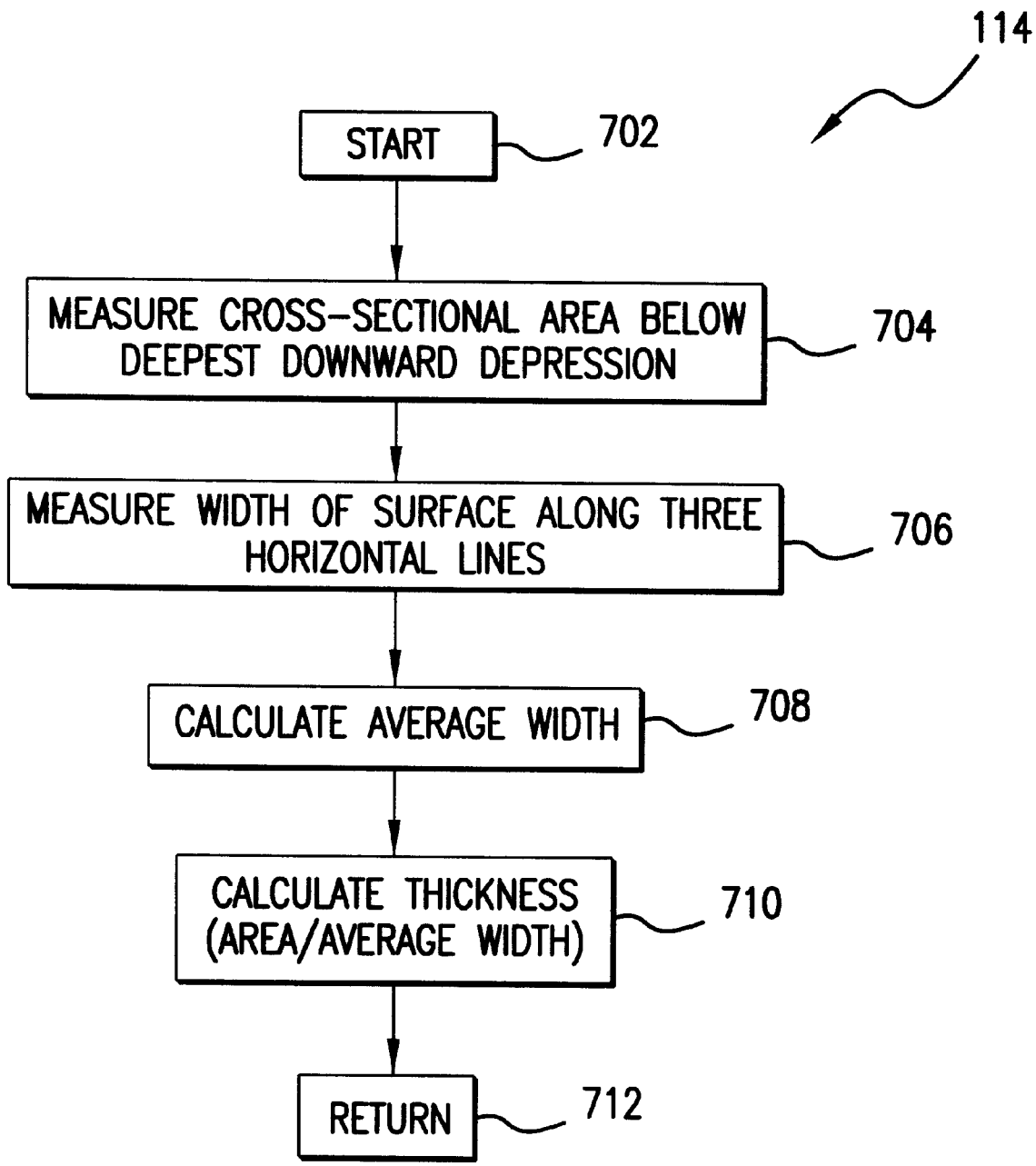
FIG. 7 is a flowchart illustrating determination of the thickness of a sole section, according to an embodiment of the invention.

The determination of the thickness of a section of a sole is performed in a step 114. In this embodiment of the invention, determining the thickness of a section of the sole requires measurement at the cross-sectional surfaces of the section. The measurement process is illustrated in greater detail in FIGS. 7 and 8. In a step 704, the area of the cross-sectional surface is measured below a line tangential to the downward depression, i.e., the shaded area in FIG. 8A. In an embodiment of the invention, measurement of the area is performed manually. In another embodiment of the invention, measurement of the area is performed using automated means.

Figure 8B:
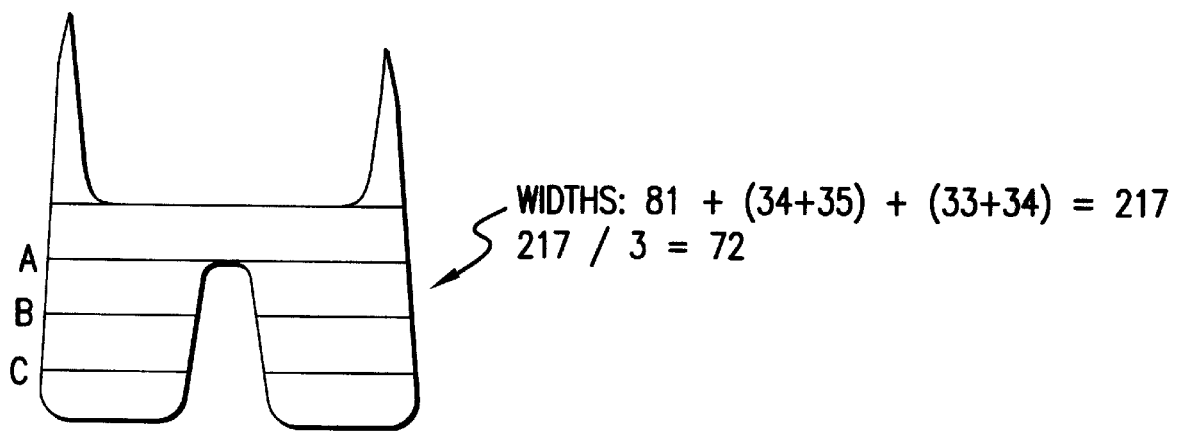
FIG. 8B is an illustration of the measurement of the average width of a cross-sectional surface of a shoe sole section.
Figure 8C:
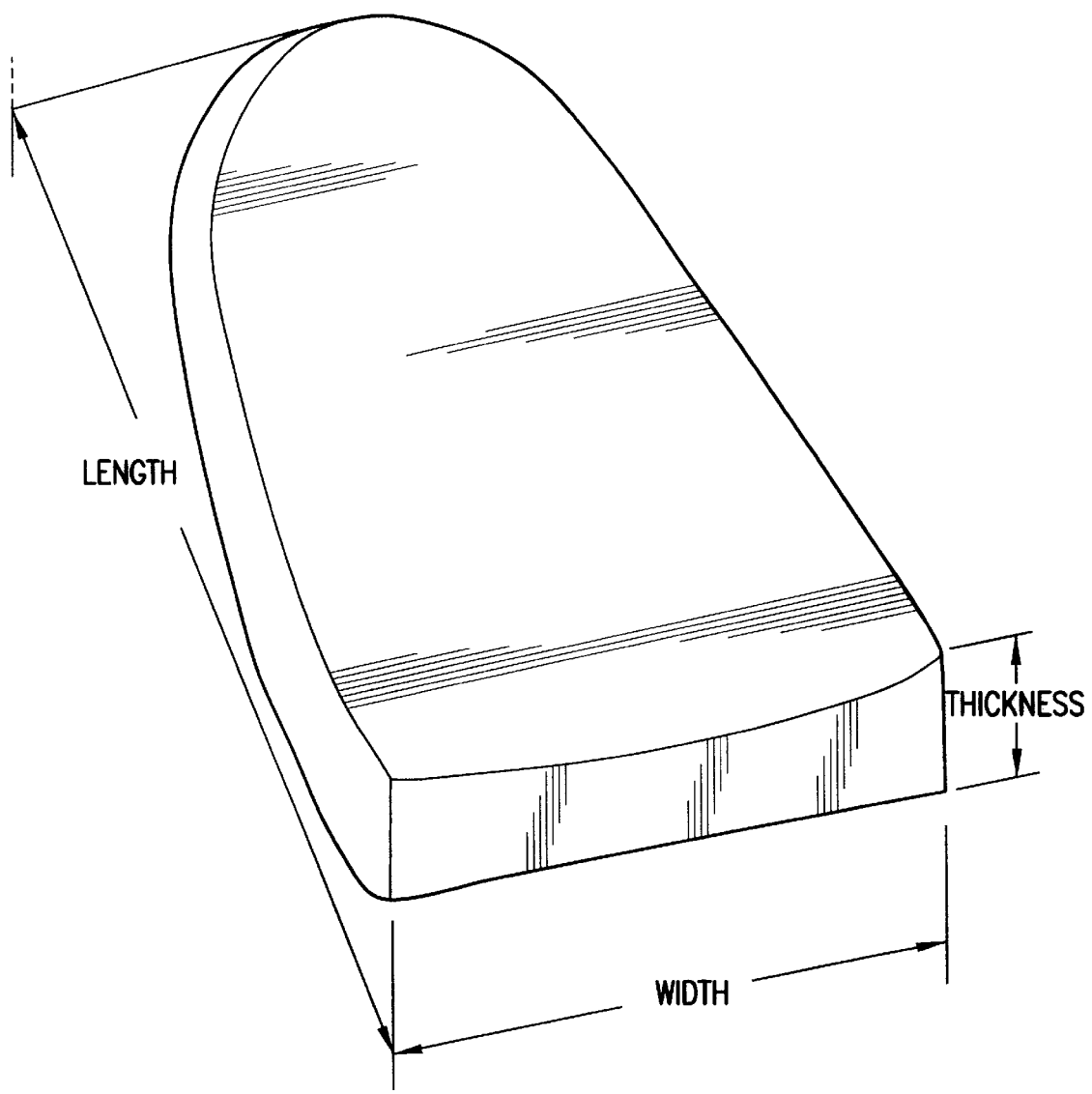
FIG. 8C is an illustration of the dimensions of a portion of a sole of a shoe.

In a step 706, the width of the cross-sectional surface is measured along each of three lines as shown in FIG. 8B, and the three width measurements are averaged to obtain an average width as in a step 708. Note that open spaces (i.e., those spaces void of material) are not counted towards an individual width measurement. In a step 710, the thickness is calculated by dividing the area (measured in step 704) by the average width (measured in step 708).

Figure 9:
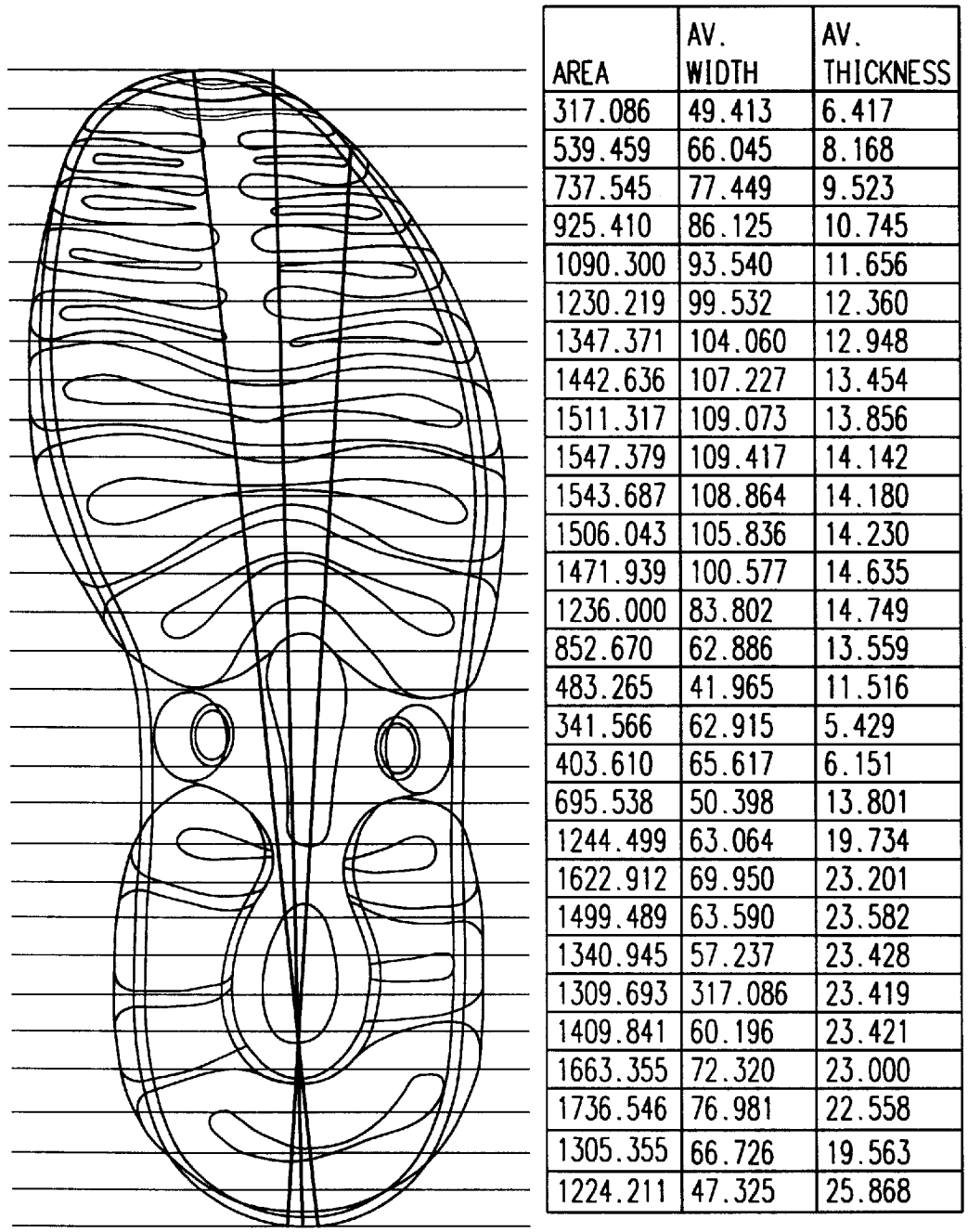
FIG. 9 is an illustration of an exemplary shoe sole model and its cross-sectional surface area, average width, and average thickness at each section.

Note also that except for the sections at either end of the sole, every section will have two cross-sectional surfaces, each of which may have a different thickness. The shape of any given cross-sectional surface, however, is necessarily the same as the shape of its facing surface on the adjacent section. The thickness calculation for these two surfaces will therefore be the same and need not be repeated. One calculation is sufficient to determine the thickness at a cross-sectional surface and its facing surface on the adjacent section. This is illustrated in FIG. 9, which shows that cross-sectional area, average width, and average thickness need to be calculated once per sectioning.

Determine length/width expansion ratio of each section

Once a thickness has been determined at each cross-sectional surface of each section, the length/width expansion ratio of each section can be determined as a function of this thickness and of the specific material selected. The dimensions for each section can then be scaled down according to the length/width expansion ratio for that thickness. This yields the necessary dimensions for the corresponding section of the mold.

Figure 10:
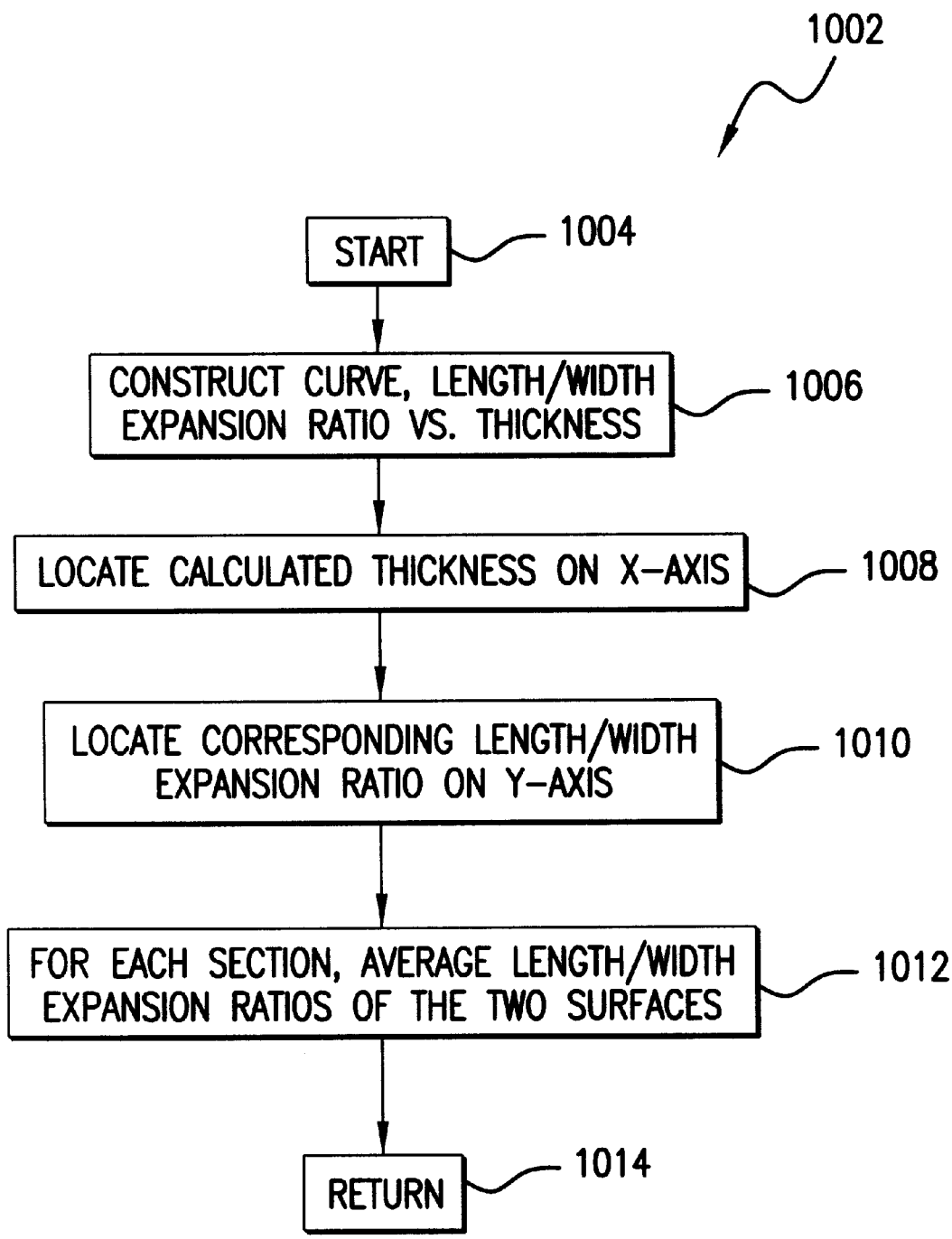
FIG. 10 is a flowchart illustrating the determination of the average length/width expansion ratio for a shoe sole section, according to an embodiment of the invention.
Figure 12:
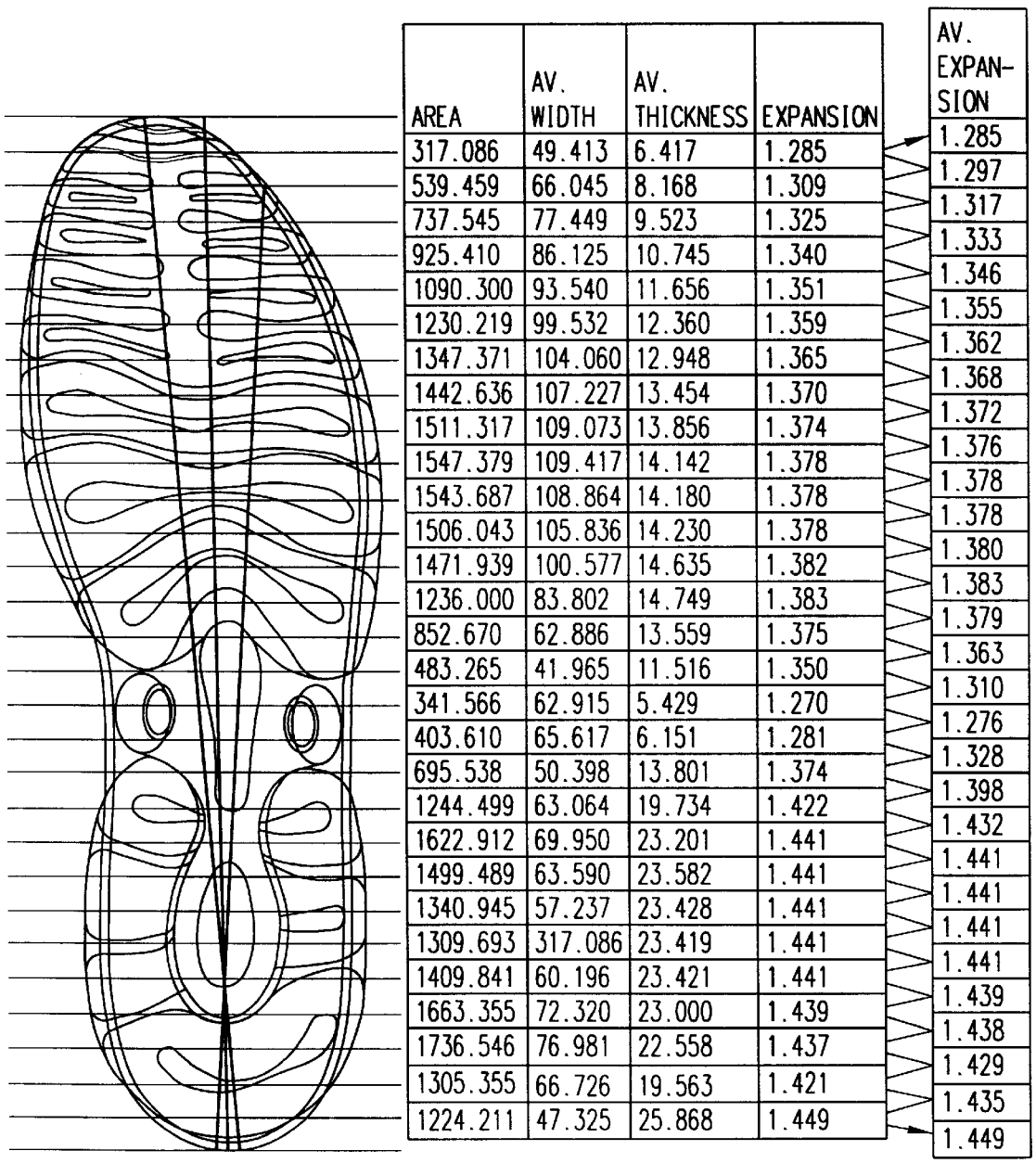
FIG. 12 is an illustration of an exemplary shoe sole model and a chart showing cross-sectional surface area, average width, average thickness, length/width expansion ratio, and average length/width expansion ratio at each section.

Determination of the length/width expansion ratio of each section takes place in a step 116, and is illustrated in greater detail in FIG. 10. In a step 1006, a graph of length/width expansion ratio versus thickness is constructed; three examples of possible resulting curves are illustrated in FIG. 11. Construction of such a curve would be apparent to one skilled in the relevant art, based on experimental testing of a particular compound. In a step 1008, for each cross-sectional surface, the average thickness calculated in step 114 is located on the x-axis. In a step 1010, the corresponding point on the curve for the selected material is found, and the length/width expansion ratio is located on the y-axis. Because each section has two cross-sectional surfaces, each section will have two length/width expansion ratios, one for each surface. This is illustrated in FIG. 12. In a step 1012, the two length/width expansion ratios for each section are averaged to obtain an average length/width expansion ratio for that section, also shown in FIG. 12.

Scale down sections

The average length/width expansion ratio of each section derived in step 1012, is used to scale down the dimensions of the corresponding section. Once these dimensions are obtained, a model of a mold for each section can be constructed. These sectional mold models can then be combined to form a composite model of the sole mold.

The process of scaling down the sections is identified in a step 18. The dimensions of each sectional mold model are obtained by numerically dividing each dimension (thickness, width and depth) by the section's length/width expansion ratio.

Blend sections together

Figure 13:
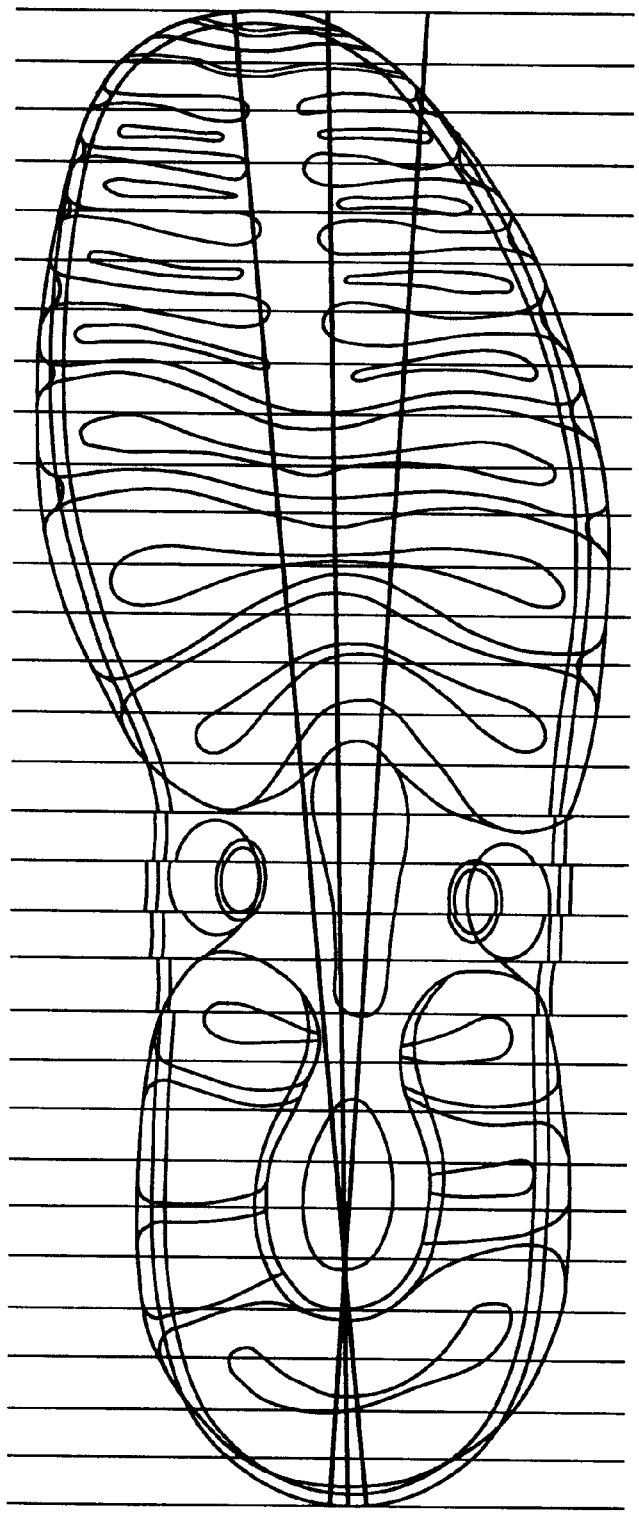
FIG. 13 is an illustration of an exemplary composite mold model of a shoe sole, composed of sectional mold models, prior to blending.

Once all the sections have been scaled down, the resulting sectional mold models must be combined to form a composite mold model. Simple combination of the sectional mold models however, produces a composite mold model with irregular surfaces, as illustrated in FIG. 13. To remedy this, the individual sections of the composite mold model must be blended together, as in a step 120. In one embodiment of the invention, this is done by hand using visual estimation and curve fitting. In another embodiment, computer-aided design (CAD) technology is used, whereby the blending is performed by a computer programmed to do so.

The result of the blending is a three-dimensional prototype of the final mold model, gauged so that a product molded in that size and shape will expand to the desired size and shape of the final product.

Environment

Figure 14:
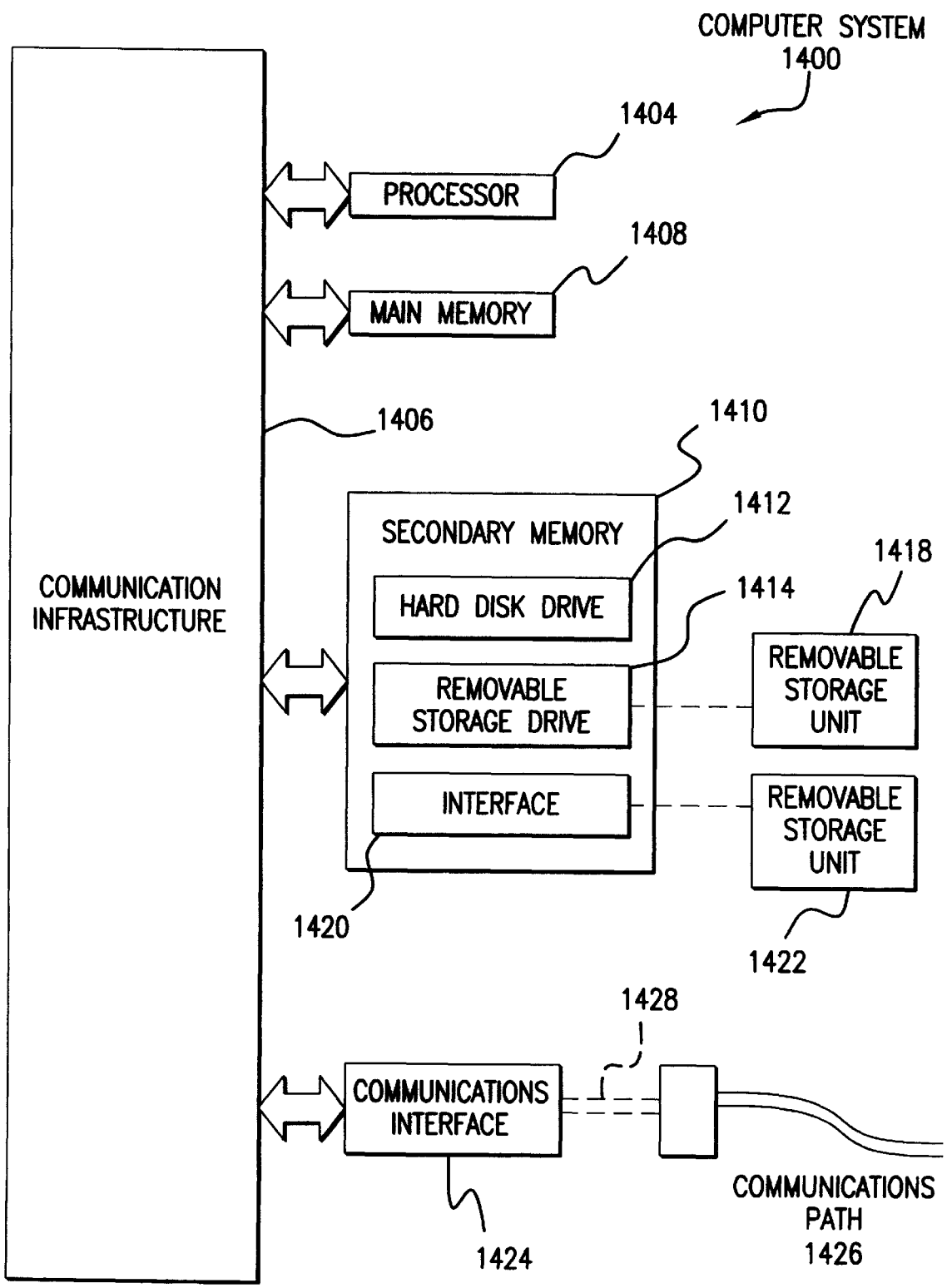
FIG. 14 is an illustration of a computer system which could be used to implement the invention.

The present invention may be implemented using hardware, software or a combination thereof and may be implemented in a computer system or other processing system. An example of such a computer system 1400 is shown in FIG. 14. The computer system 1400 includes one or more processors, such as processor 1404. The processor 1404 is connected to a communication infrastructure 1406 (e.g., a bus or network). Various software implementations are described in terms of this exemplary computer system. After reading this description, it will become apparent to a person skilled in the relevant art how to implement the invention using other computer systems and/or computer architectures.

Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well known manner. Removable storage unit 1418, represents a floppy disk, magnetic tape, optical disk, etc. which is read by and written to by removable storage drive 1414. As will be appreciated, the removable storage unit 1418 includes a computer usable storage medium having stored therein computer software and/or data.

In alternative implementations, secondary memory 1410 may include other similar means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a PCMCIA slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (i.e., channel) 1426. This channel 1426 carries signals 1428 and may be implemented using wire or cable, fiber optics, a phone line, a cellular phone link, an RF link and other communications channels.

In this document, the terms "computer program medium" and "computer usable medium" are used to generally refer to media such as removable storage drive 1414, a hard disk installed in hard disk drive 1412, and signals 1428. These computer program products are means for providing software to computer system 1400.

Computer programs (also called computer control logic) are stored in main memory 1408 and/or secondary memory 1410. Computer programs may also be received via communications interface 1424. Such computer programs, when executed, enable the computer system 1400 to implement the present invention as discussed herein. In particular, the computer programs, when executed, enable the processor 1404 to implement the present invention. Accordingly, such computer programs represent controllers of the computer system 1400. Where the invention is implemented using software, the software may be stored in a computer program product and loaded into computer system 1400 using removable storage drive 1414, hard drive 1412 or communications interface 1424.

Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

FIG. 14 illustrates a computer system which could be used to implement an embodiment of the invention.

What is claimed is:

1. A method of gauging a size and shape of a mold cavity for injection molding a product, the method comprising the steps of:
    (a) selecting a durometer for said product;
    (b) determining an expansion ratio based on said durometer;
    (c) selecting a product thickness value;
    (d) identifying a product material which, based on said product thickness value, results in said expansion ratio; and
    (e) determining the size and shape of said mold cavity, based on a thickness of the product at a plurality of sections of the product and based on an expansion ratio for said selected product material at each section.

2. The method of claim 1, wherein said step (a) comprises the step of:
    (a) selecting a desired durometer at a thickest point of the product to be said durometer.

3. The method of claim 1, wherein said step (b) comprises the steps of:
    (a) constructing a curve of durometer versus expansion ratio; and
    (b) locating a point on said curve for said selected durometer and determining said expansion ratio corresponding to said point.

4. The method of claim 1, wherein said step (b) comprises the steps of:
    (a) constructing a table of durometer values and corresponding expansion ratios; and
    (b) determining said expansion ratio which corresponds to said selected durometer in said table.

5. The method of claim 1, wherein said product thickness value is selected to be the thickest point in the product.

6. The method of claim 1, wherein step (d) comprises the step of:
    (a) choosing an amount of blowing agent to be added to a compound for said material, such that said material has said expansion ratio for said product thickness value.

7. The method of claim 6, wherein step (a) comprises the steps of:
    (a) constructing curves of expansion ratio versus product thickness value, wherein each curve corresponds to a different combination of said blowing agent and said compound; and (b) identifying that material whose curve indicates that, given said selected product thickness value, said expansion ratio will result.

8. The method of claim 1, further comprising the steps of:
   (a) constructing a three-dimensional mold model for each said section, using said gauged mold;
   (b) modeling a composite mold model comprised of said sectional mold models; and
   (c) smoothing irregularities in said composite mold model to produce a single continuous mold model.

9. A method for gauging a mold cavity for injection molding a portion of an article of footwear, the method comprising the steps of:
   (a) selecting a durometer for the portion of the article of footwear;
   (b) determining an expansion ratio, based on said selected durometer;
   (c) selecting a thickness value;
   (d) identifying a material, based on said thickness value and said expansion ratio;
   (e) dividing the portion of the article of footwear into a plurality of sections;
   (f) determining a thickness for each section;
   (g) determining an expansion ratio for said selected material for each section, based on said thickness;
   (h) gauging said mold in each section, based on said expansion ratio for each section.

10. The method of claim 9, wherein said step (a) comprises the step of:
    (a) selecting a desired durometer at a thickest point of the portion of the article of footwear to be said durometer.

11. The method of claim 9, wherein said step (b) comprises the steps of:
    (a) constructing a curve of durometer versus expansion ratio; and
    (b) locating a point on said curve for said selected durometer and determining said expansion ratio corresponding to said point.

12. The method of claim 9, wherein said step (b) comprises the steps of:
    (a) constructing a table of durometer values and corresponding expansion ratios; and
    (b) determining said expansion ratio which corresponds to said selected durometer in said table.

13. The method of claim 9, wherein said thickness value is selected to be the thickest point in the portion of the article of footwear.

14. The method of claim 9, wherein step (d) comprises the step of:
    (a) choosing an amount of blowing agent to be added to a compound for said material, such that said material has said expansion ratio for said thickness value.

15. The method of claim 14, wherein step (a) comprises the steps of:
    (a) constructing curves of expansion ratio versus thickness value, wherein each curve corresponds to a different combination of said blowing agent and said compound; and (b) identifying that material whose curve indicates that, given said selected thickness value, said expansion ratio will result.

16. The method of claim 9, wherein step (e) comprises the step of:
    (a) sectioning said portion of the article of footwear into a plurality of sections along the length of said portion.

17. The method of claim 9, wherein step (e) comprises the step of:
    (a) sectioning said portion of the article of footwear into a plurality of sections along the length of said portion at 10 mm intervals.

18. The method of claim 9, wherein step (f) comprises the steps of:
    (a) measuring a cross-sectional area at each cross-sectional surface of each section;
    (b) measuring a cross-sectional width of each cross-sectional surface of each section; and
    (c) dividing said cross-sectional area by said cross-sectional width for each cross-sectional surface of each section, to obtain an average thickness for each said cross-sectional surface.

19. The method of claim 18, wherein said step (a) comprises the step of:
    (a) at each cross-sectional surface of each section, measuring a cross-sectional area below a horizontal line drawn tangential to the deepest downward depression in said section.

20. The method of claim 18, wherein step (b) comprises the steps of:
    (a) measuring a width of each said cross-sectional surface of each section at a plurality of places, omitting empty spaces; and
    (b) averaging said widths to obtain said cross-sectional width for each said cross-sectional surface of each said section.

21. The method of claim 9, wherein said step (g) comprises the steps of:
    (a) determining an expansion ratio at each cross-sectional surface of each section; and
    (b) for each section, averaging said expansion ratios of said cross-sectional surfaces to obtain said expansion ratio for said section.

22. The method of claim 9, wherein said step (h) comprises the step of:
    (a) for each section, dividing said thickness by said expansion ratio to obtain a mold cavity thickness.

23. The method of claim 9. further comprising the steps of:
    (a) constructing a three-dimensional mold model for each said section, using said gauged mold;
    (b) modeling a composite mold model comprised of said mold models; and
    (c) smoothing irregularities in said composite mold model to produce a single continuous mold model.

24. A method of manufacturing an article of footwear by gauging the size and shape of a mold cavity for injection molding a portion of the article of footwear, comprising the steps of:

(a) selecting a durometer for the portion of the article of footwear;

(b) determining a first expansion ratio, based on said selected durometer;

(c) selecting a thickness value;

(d) identifying a material, based on said thickness value and said first expansion ratio;

(e) dividing the portion of the article of footwear into a plurality of sections;

(f) determining a thickness for each section;

(g) determining a second expansion ratio for said selected material for each section, based on said thickness of each section; and (h) gauging said mold in each section, based on said second expansion ratio for each section.

* * * * *